US010199012B2

(12) United States Patent
Raymann et al.

(10) Patent No.: US 10,199,012 B2
(45) Date of Patent: Feb. 5, 2019

(54) ADJUSTMENT OF DISPLAY PARAMETERS

(71) Applicant: Apple Inc., Cupertino, CA (US)

(72) Inventors: Roy J. E. M. Raymann, Campbell, CA (US); Nicolas P. Bonnier, Campbell, CA (US); Jonathan T. Varbel, San Jose, CA (US); Lu Zhang, Campbell, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 15/427,947

(22) Filed: Feb. 8, 2017

(65) Prior Publication Data

US 2018/0226055 A1 Aug. 9, 2018

(51) Int. Cl.
G09G 5/10 (2006.01)
G06F 3/01 (2006.01)
G09G 3/20 (2006.01)
G06F 3/0484 (2013.01)

(52) U.S. Cl.
CPC ............... G09G 5/10 (2013.01); G06F 3/013 (2013.01); G06F 3/015 (2013.01); G06F 3/04847 (2013.01); G09G 3/2003 (2013.01); G09G 2320/064 (2013.01); G09G 2320/0666 (2013.01); G09G 2320/08 (2013.01); G09G 2360/144 (2013.01)

(58) Field of Classification Search
CPC .... G09G 5/10; G09G 3/2003; G09G 2320/08; G09G 2320/0666; G09G 2320/064; G09G 2360/144; G06F 3/013; G06F 3/015; G06F 3/04847
See application file for complete search history.

(56) References Cited

U.S. PATENT DOCUMENTS

| 2010/0277105 A1* | 11/2010 | Oyama | A61N 5/0618 315/312 |
| 2016/0121073 A1* | 5/2016 | Mok | G09G 3/20 600/27 |
| 2017/0354000 A1* | 12/2017 | Gordin | H05B 33/08 |

OTHER PUBLICATIONS

Lucas Robert J., et al., "Measuring and Using Light in the Melanopsin Age." Cell Press. Trends in Neurosciences, Jan. 2014, vol. 37, No. 1. 9 pages.
f.lux, "Software to Make Your Life Better." Downloaded from https://justgetflux.com/ on Oct. 14, 2016. 2 pages.
(Continued)

Primary Examiner — Tapas Mazumder
(74) Attorney, Agent, or Firm — Kilpatrick Townsend and Stockton LLP

(57) ABSTRACT

Parameters of a display may be adjusted in response to accessing a time value corresponding to an electronic device that includes the display. A brightness value of the display may be adjusted based on the time value to maintain a display characteristic value within a predefined range and below a threshold. The display characteristic value may be independently controllable by one of the brightness or the color temperature of the display. A set of red green blue (RGB) color values of the display may be adjusted independent of the adjustment to the brightness value to maintain the display characteristic value within the predefined range and below the threshold while maintaining the brightness value of the display. In some examples, the RGB color values of the display may be adjusted at approximately the same time as the adjustment of the set of RGB color values of the display is performed.

17 Claims, 7 Drawing Sheets

(56) References Cited

OTHER PUBLICATIONS f.luxometer: iPad Pro, Melanopic (Lucas 2014). Downloaded from https://fluxometer.com/rainbow on Feb. 7, 2017. 5 pages.
Lucas, Robert J. et al., "Irradiance Toolbox, User Guide." Oxford. Oct. 18, 2013. 19 pages.

* cited by examiner

ADJUSTMENT OF DISPLAY PARAMETERS

BACKGROUND

Many modern day electronic devices include electronic displays to output (and in some cases receive as input) visual information. The underlying display technology of these electronic displays may be various. For example, such display technologies may include light-emitting diode displays (LED), electroluminescent displays, plasma displays, liquid crystal displays (LCD), organic light-emitting diode displays (OLED), and others. The light output from these electronic displays can have various color temperatures ranging from warm, mostly yellow to cool, mostly blue temperatures, etc. The light may also be mixed.

Bright light with a rich amount of blue light (like daylight) serves as a trigger to the human body to be awake and alert, whereas the absence of bright and blue light during the evening triggers the human body to go into a more restful state, partly due to the release of sleep inducing (or soporific) hormone. Bright or blue light at night can block transition into a more restful state at night and can block the release of sleep inducing hormone.

As more time is spent viewing electronic displays, especially those that are relatively bright and have a rich amount of blue light, the release of a soporific hormone may be interrupted. For example, if a user is exposed to a bright display with a rich amount of blue light late into the evening, the user's body's release of a soporific hormone and transition into a more restful state might be compromised or fully blocked due to that light exposure. As a result, the user may have a difficult time falling asleep. This problem is compounded when the difference between the brightness level of the electronic display and the ambient light is high.

BRIEF SUMMARY

Examples of the present disclosure can provide systems, devices, methods, and computer-readable media for adjusting display parameters of a display to maintain a display characteristic value. According to one example, an electronic device is described. The electronic device may include a display, a memory configured to store computer-executable instructions, and a processor in communication with the memory and configured to execute the computer-executable instructions to perform a series of operations. The operations may include accessing a brightness setting for the display. The operations may also include accessing a color temperature setting for the display. The operations may also include detecting fulfillment of a time condition that corresponds to a particular time of day or a particular daily event. The operations may also include, at least in response to the detecting, independently adjusting the brightness setting and the color temperature setting to maintain a display characteristic value such that the display characteristic value remains within a predefined range of display characteristic values and below a display characteristic threshold. The display characteristic value may represent a predefined physiological effect that is based at least in part on brightness of the display and color temperature of the display.

According to another example, a method implemented by a computer system is described. The method may include accessing a time value corresponding to an electronic device that includes a display. The time value may represent a particular time of day or a particular daily event. The method may also include adjusting, based at least in part on the time value, a brightness value of the display to maintain a display characteristic value within a predefined range and below a threshold. The display characteristic value may be independently controllable by one of brightness of the display or color temperature of the display. The method may also include, independent of the adjustment to the brightness value, adjusting, based at least in part on the time value, a set of red green blue (RGB) color values of the display to maintain the display characteristic value within the predefined range and below the threshold while maintaining the brightness value of the display, or independently adjusting the brightness value at approximately the same time as the adjusting of the set of RGB color values of the display.

According to yet another example, one or more computer-readable media storing computer-executable instructions is described. The computer-executable instructions, when executed by a processor, may configure a processor to perform operations including accessing dimension information corresponding to a display of a user device. The operations may also include accessing distance information identifying a viewing distance for viewing the display. The operations may also include, for a display characteristic threshold, determining a range of brightness values for the display based at least in part on the dimension information and the distance information. The range of brightness values may include brightness values below the display characteristic threshold. The operations may also include, for the display characteristic threshold, determining a range of red green blue (RGB) color values for the display based at least in part on the dimension information and the distance information. The range of RGB color values may include RGB color values below the display characteristic threshold. The operations may also include selecting a brightness value and a set of RGB color values for the display from the range of brightness values and the range of RGB color values based at least in part on a time value. The time value may represent a particular time of day or a particular daily event.

DETAILED DESCRIPTION

Figure 1:
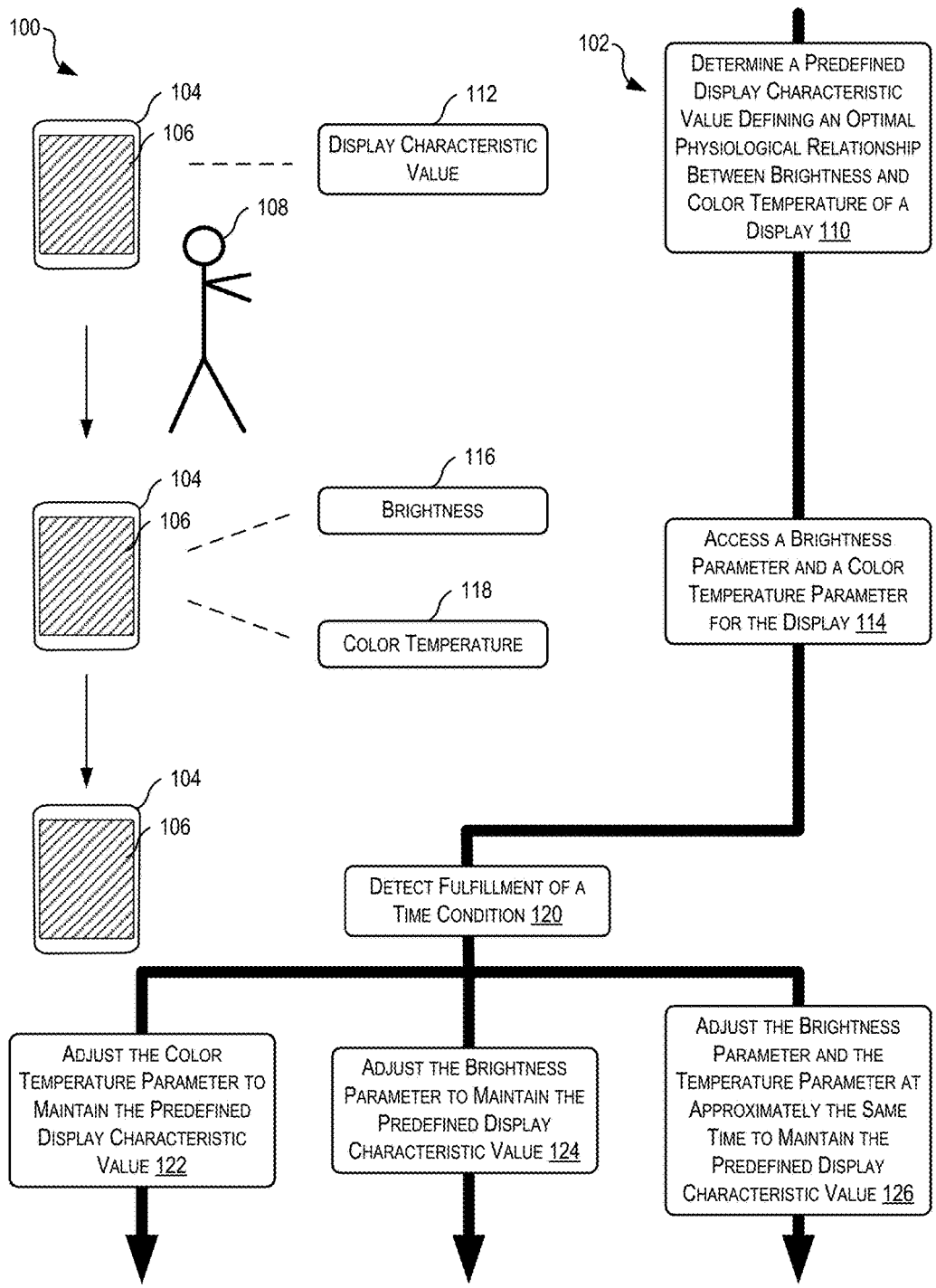
FIG. 1 illustrates a simplified block diagram depicting an example flow for adjusting display parameters to maintain a display characteristic value, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable media for adjusting display parameters of a display to maintain a display characteristic value. The display characteristic value represents a threshold value based on light composition (e.g., color temperature) and brightness of the light, given a viewing distance between the display and a user. The display parameters are adjusted in accordance with the display characteristic value to be considerate of certain non-visual effects of light (e.g., alertness, sleepiness, etc.). For example, to improve the likelihood that a user's body will transition to a more restful state at night, the user should avoid exposure to light that is too bright and/or has a high color temperature in the time leading up to bedtime. It is understood, however, that exposure to artificial light from electronic displays, even prior to bedtime, cannot always be avoided. Thus, the techniques described herein utilize the display characteristic value as a standard according to which both brightness and color temperature of electronic displays can be independently adjusted. Doing so may enable viewing of electronic displays around bedtime, with a minimal impact on the user's body transitioning into a more restful state at night, including the release of a soporific hormone that prepares the body for sleep. As an additional example, to improve the likelihood that the user's body will be alert during the day, the user should be exposed to bright light that has a high color temperature value. Thus, the techniques described herein adjust the display parameters (e.g., brightness and color temperature) to improve alertness of the user during daytime hours.

The display characteristic value described herein may be determined based on experimental data, through analytical computation, or in other any other suitable manner. For example, a melanopic spectral efficiency function may be used to compute the display characteristic value. In a graphical scenario, the display characteristic value may be represented as a two dimensional curve, with brightness on the Y-axis and color temperature on the X-axis. For a set of viewing conditions (e.g., area of a particular display, a viewing distance between the display and a user, ambient light, and other similar conditions), the display characteristic value may be used to compute a range of possible brightness values and a range of possible color temperature values. In this scenario, the range of possible brightness values and the range of possible color temperature values may be located beneath the curve. Thus, for every possible brightness value in the range, there is at least one corresponding color temperature value that can be plotted on the curve or that falls below the curve, either of which would be suitable to minimize the impact on the body's transition into a more restful state at night. Once the ranges of possible brightness values and possible color temperature values are known, an existing brightness value and an existing color temperature value may adjusted to maintain the display characteristic. These existing values may be stored in settings of the particular display.

FIG. 1 illustrates a simplified block diagram 100 depicting an example process 102 for adjusting display parameters to maintain a display characteristic value, according to at least one example. The diagram 100 includes a computing device 104 including a display 106. The diagram 100 also includes a user 108 who views visual content displayed on the display 106. The computing device 104 can be any suitable electronic device capable of outputting visual information to the display 106. In some examples, the computing device 104 is separate from the display 106 (e.g., a computer connected to an external monitor). In other examples, the computing device 104 and the display 106 are included as part of the same electronic device (e.g., a smartphone, a tablet, a laptop, a flat screen television, computers with integrated displays, and other suitable electronic devices).

The process 102 may begin at 110 by determining a predefined display characteristic value 112 defining an optimal physiological relationship between brightness and color temperature of the display 106. The predefined display characteristic value 112 defines the properties of light that affect the release of a soporific hormone in the user 108 such as Melatonin. In some examples, the predefined display characteristic value 112 may be representative of melanopic illuminance. The display characteristic value 112 may be determined based at least in part on experimental data, analytical computation, or in any other suitable manner. For example, the article "Measuring and Using Light in the Melanopsin Age" by Lucas et al. (2014), published in *Trends in Neuroscience* in January 2014 and available at http://personalpages.manchester.ac.uk/staff/robert.lucas/Lucas%20et%20a1%2014.pdf, provides examples for calculating melanopic illuminance for humans, including an updated melanopic spectral efficiency function and an excel-based toolbox and associated user guide to help calculate melanopic illuminance.

In some examples, the physiological relationship between brightness and color temperature of the display 106 may be optimal with respect to viewing conditions of the display 106. The viewing conditions may include an area of the display 106, a viewing distance between the display 106 and the user 108, a recommended viewing distance for the particular display 106, a time of day, and/or characteristics of ambient light (e.g., natural light and/or other artificial light) in which the display 106 is being viewed. For example, if the viewing distance changes, the ranges of suitable brightness values and suitable color temperature values may change accordingly. In this manner, the predefined display characteristic value 112 is used to determine the ranges of suitable brightness values and suitable color temperature values to maintain the predefined display characteristic value 112.

At 114, the process 102 accesses a brightness parameter 116 and a color temperature parameter 118 for the display 106. The brightness parameter 116 and the color temperature parameters 118 may be stored as configuration settings in memory of the computing device 104. In some examples, accessing the parameters 116, 118 includes measuring brightness and color temperature of the display 106 using any suitable combination of sensors. The brightness parameter 116 may represent brightness of the display 106 in any suitable manner including, for example, in terms of nits (nt) or candela per square meter (cd/m^2). The brightness parameter 116 may be controllable for the display 106 at a pixel level (e.g., each pixel may have a brightness value). In some examples, the brightness parameter 116 may be adjusted manually in response to user input. For example, a user may access the configuration settings for the computing device 104 and input a particular value for the brightness parameter 116 or by manipulating a graphical control element such as a slider or track bar (e.g., less bright to more bright).

The color temperature parameter 118 may represent color temperature of the display 106 in any suitable manner including, for example, in terms of kelvin (K). In this manner, the color temperature parameter 118 may represent a whiteness level of the display 106. The color temperature parameter 118 may be controllable for the display 106 at a pixel level (e.g., each pixel may have a temperature value, which may be based on a set of color channels associated with the pixel). In some examples, the color temperature parameter 118 may be adjusted manually in response to user input. For example, a user may access the configuration settings for the computing device 104 and input a particular value for the color temperature parameter 118 or may manipulate a graphical control element such as a slider or track bar (e.g., warm to cold).

At 120, the process 102 detects fulfillment of a time condition. The time condition may represent a particular time of day, a range of times, or one or more events. The time condition is used to determine when and how to adjust the parameters 116, 118 to configure the display 106 in accordance with the display characteristic value 112. For example, the parameters 116, 118 of the display 106 may be adjusted in a first manner prior to the user 108 retiring to bed (e.g., at a first fixed time, based on the sunset, or manually by the user 108), and adjusted in a second manner in the morning after the user 108 has woken up or in connection with the user 108 waking up (e.g., at a second fixed time, based on the sunrise, or manually by the user 108). Thus, the time condition may represent a fixed time of day (e.g., 7:00 pm), a range of times (e.g., 7:00 pm-7:00 am), one or more events (e.g., sunset, midday, and sunrise at a location of the display 106), and/or any suitable combination of the foregoing (e.g., 7:00 pm and sunrise at the location of the display 106). In some examples, the parameters 116, 118 of the display 106, whether concurrently or individually, may be adjusted based on the time condition in a continuous or interval basis (e.g., 5, 10, 15 minute cadence).

In some examples, any one or more fixed times, which may constitute a range of times, may be selected by the user 108, suggested by the computing device 104, and/or determined in any other suitable manner. The fixed time may be selected so as to be earlier than an expected bedtime by some threshold amount (e.g., 1 hour). For example, a fixed time of 9:00 pm may be appropriate for an expected bedtime of 10:00 pm. When the computing device 104 or some other system that performs the process 102 detects that it is 9:00 pm or later (e.g., the time condition has been fulfilled), the computing device 104 or other system may proceed with the process 102 (e.g., the parameters 116, 118 may be adjusted to configure the display 106). In this example, the display 106 may remain in its configured state at least until a second time condition is fulfilled or the user 108 manually adjusts the parameters 116, 118. For example, a second fixed time may have been previously selected by the user 108, suggested by the computing device 104, and/or determined in any other suitable manner. The second fixed time may be correlated with a wakeup time for the user 108 (e.g., via an alarm application of the computing device 104), or may also constitute an arbitrary selection.

In some examples, the parameters 116, 118 of the display 106 may be automatically configured based on sunrise, midday, and sunset information or other events. For example, the parameters 116, 118 may be adjusted during the daytime to correspond to the changes in natural daylight (e.g., gradually getting brighter and cooler towards midday and gradually getting dimmer and warmer towards evening). The display characteristic value 112 may be used as a gauge while the parameters 116, 118 are adjusted throughout the day. For example, during the daytime, the parameters 116, 118 may be adjusted in a manner that the display characteristic value 112 exceeds some predefined threshold value (e.g., 5). Adjusting the parameters 116, 118 during the daytime hours may trigger alertness in the user 108 so as to support a physiological effect. For example, during a twenty-four hour period, the brightness parameter 116 and the color temperature parameter 118 may be adjusted to reach a predefined peak display characteristic value based on a geographical location determined midday (e.g., noon) or a measured midday (e.g., by the computing device 104 sensing ambient light or some other light sensing system). In some examples, the predefined peak display characteristic value may be set manually or automatically linked to measured light levels. The brightness parameter 116 and the color temperature parameter 118 may be adjusted incrementally towards the predefined peak display characteristic value so as to reach the peak value at or around noontime. After reaching the peak value, the brightness parameter 116 and the color temperature parameter 118 may be adjusted incrementally away from the predefined peak display characteristic value.

During the nighttime, on the other hand, the parameters 116, 118 may be adjusted in a manner that maintains the display characteristic value 112 at or below the predefined threshold. As the sunrise, midday, and sunset changes based on location, location information may be accessed in order for the computing device 104 to correlate the changes in the parameters 116, 118 with the sunrise, midday, and sunset. For example, the computing device 104 may include a location sensor (e.g., global positioning system (GPS) chip) capable of alone, or in communication with other devices, determining a location of the computing device 104 and/or the display 106. The computing device 104 may also determine its location using network triangulation techniques or other suitable geolocation identification techniques. In some examples, the location of the computing device 104 may be static and stored in memory of the computing device 104. In any event, once the location is known, a table of sunrise, midday, and sunset times (e.g., sunrise sunset calendar) may be accessed. This table or other data structure may be stored on the computing device 104, accessed from an application of the computing device 104, and/or may be accessed from some other device, e.g., via a network connection. In some examples, the computing device 104 may receive sunrise/sunset information from a sunrise/sunset service in response to a request for such information. For example, the computing device 104 may send its current location to the sunrise/sunset service and request a sunrise, midday, sunset time, and/or any other time for the current location. In response, the service may send a communication to the computing device 104 that includes the sunrise, midday, sunset time, and/or any other time for the current location.

After the process 102 detects fulfillment of the time condition at 120, the process 102 proceeds to adjust at least one of the parameters 116, 118 to maintain the predefined display characteristic value 112. In most cases, maintaining the predefined display characteristic value 112 may include adjusting at least one of the parameters 116, 118 to maintain the predefined display characteristic value 112 with respect to a threshold. The threshold may correspond to a value of the predefined display characteristic value 112 which, when exceeded, may interrupt the body's transition into a more restful state at night.

At 122, the process 102 adjusts the color temperature parameter 118 to maintain the predefined display characteristic value 112. This may include adjusting red green blue (RGB) color values of pixels included in the display 106.

For example, RGB channels associated with the RGB values can be adjusted to make the color temperature warmer or cooler, depending on the implementation. Reducing the color temperature parameter 118 may include reducing blue and green channels more than red channels. Increasing the color temperature parameter 118 may include increasing blue and green channels. The color temperature parameter 118 may also include adjusting color values of other color spaces such as CIEXYZ (International Commission on Illuminance's XYZ space), CIELAB (International Commission on Illuminance's LAB space), RGBW (red green blue white), RGBG (red green blue green), IPT (Ebner and Fairchild's color space), and any other suitable space. The adjustment of color values may be consistent across the entire display 106. For example, all color values may be adjusted to reduce or increase color temperature by some fixed percentage. The adjustment of the color values may also be selective at a lower level of granularity than the entire display 106 (e.g., adjustment of a portion of the display 106, a set of pixels, or individual pixels). Selective adjustment may be performed in a manner that results in a net decrease or a net increase in color temperature across the entire display 106. In some examples, the color temperature parameter 118 may be adjusted independent of the adjustment to the brightness parameter 116. This may result in the brightness parameter 116 remaining unchanged while the color temperature parameter 118 is adjusted.

At 124, the process 102 adjusts the brightness parameter 116 to maintain the predefined display characteristic value 112. This may include adjusting brightness of the display 106. As described herein, this may include adjusting one or more settings of the display to increase or decrease the brightness of the display 106. The brightness may be measured by any suitable sensor, as described herein, or may also be inferred from a brightness setting. Similar to the adjustment of the color temperature parameter 118, the brightness parameter 116 may be consistent across the entire display 106. For example, brightness of the entire display may be increased or decreased by some fixed percentage. The adjustment of brightness may also be selective at a lower level of granularity than the entire display 106 (e.g., adjustment of a portion of the display 106, a set of pixels, or individual pixels). Selective adjustment may be performed in a manner that results in a net increase or a net decrease in brightness across the entire display 106. In some examples, the brightness parameter 116 may be adjusted independent of the adjustment of the color temperature parameter 118. This may result in the color temperature parameter 118 remaining unchanged while the brightness parameter 116 is adjusted.

At 126, the process 102 adjusts the brightness parameter 116 and the color temperature parameter 118 at approximately the same time to maintain the display characteristic value 112. In this example, both the brightness parameter 116 and the color temperature parameter 118 are adjusted to maintain the display characteristic value 112. For example, the brightness parameter 116 may be adjusted to increase brightness, while the color temperature parameter 118 is adjusted to have a lower temperature value. The brightness parameter 116 may also be increased as the color temperature parameter 118 is adjusted to have a higher temperature value. Other permutations are also possible. In some examples, the adjustments performed at 122, 124, or 126 may depend at least in part on the viewing conditions of the display 106 (e.g., viewing distance, ambient light present, content being displayed, and other similar conditions) and properties of the display 106 (e.g., area of display 106, range of adjustment for color temperature, and range of adjustment for brightness).

Figure 2:
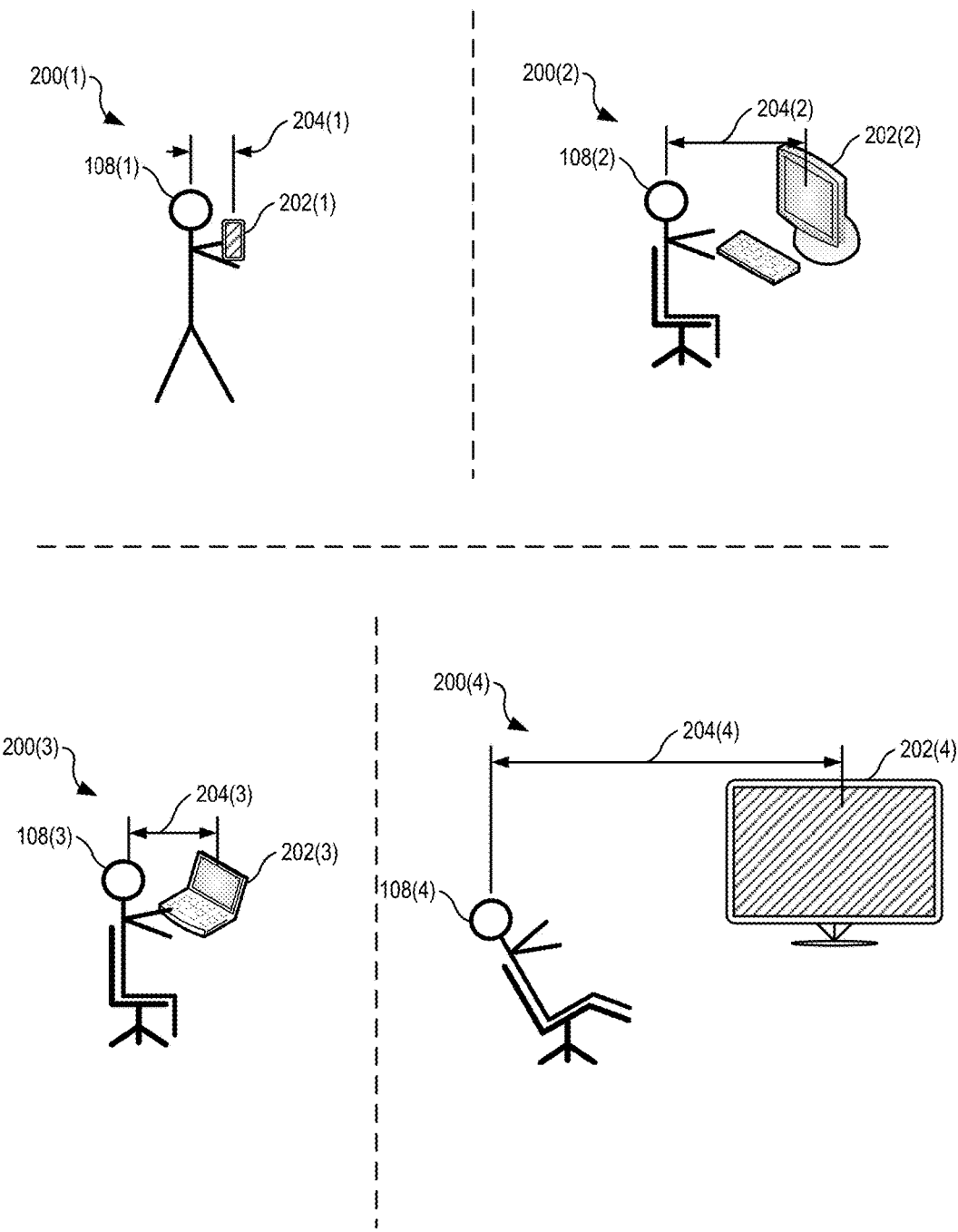
FIG. 2 illustrates a set of environments in which techniques relating to adjusting display parameters to maintain a display characteristic value can be implemented, according to at least one example.

FIG. 2 illustrates a set of viewing environments 200(1)-200(4) in which techniques relating to adjusting display parameters to maintain a display characteristic value can be implemented, according to at least one example. In each of the viewing environments 200, the user 108 is interacted with a different electronic device 202. Depending on the conditions present in the different viewing environments 200, the predefined display characteristic value may vary. The conditions that may be considered include, for example, a display area of the electronic device 202 and a viewing distance 204 measured between a display of the electronic device 202 and the user 108. In some examples, ambient light may also be a condition.

The electronic devices 202 are examples of the computing device 104 and/or the display 106. For example, the electronic device 202(1) is a mobile user device (e.g., mobile phone, tablet, smart phone, wearable device, etc.) that includes a display and a computing device together in one device (e.g., the computing device 104 and the display 106 are combined in to one device). As an additional example, the electronic device 202(4) is a monitor (e.g., a flat screen television, a computer monitor, etc.) that functions primarily like the display 106 to output information. In some examples, the electronic device 202(4) may also include a computing device similar to the computing device 104 (e.g., a SmartTV). It should be understood, however, that the viewing environments 200(1)-200(4) are examples of some of the viewing environments in which the techniques described herein may be implemented, and other viewing environments including other electronic devices 202 may also be used to implement the techniques described herein.

Beginning with the viewing environment 200(1), the viewing environment 200(1) may include the user 108(1) interacting with the electronic device 202(1) (e.g., viewing visual output information, inputting information at an input device, etc.). As noted herein, the electronic device 202(1) is an example of a mobile user device. The user 108(1) may view a display of the electronic device 202(1) at a viewing distance 204(1), measured between the display of the electronic device 202 (1) and the user 108(1) (e.g., eyes of the user 108(1)).

Generally, the viewing distances 204 described herein may have some precomputed static value and/or a dynamic value, and may vary depending on the area of the display of the electronic device 202. For example, the smaller the electronic device 202 (e.g., the smaller the display of the electronic device), the smaller the value of the viewing distance 204 will be. The value of the viewing distance 204 may be precomputed based on an average viewing distance for the particular electronic device 202, a recommended viewing distance (e.g., set by a manufacture or a standards body), or any other information relating to a likely viewing distance (e.g., whether electronic device 202 is fixed or moveable). The value of the viewing distance 204 may be dynamically determined depending on actual conditions in which the electronic device 202 is found. For example, one or more sensors (e.g., camera, depth sensor, etc.) on the electronic device 202 may be used to estimate an actual viewing distance 204. The estimate may be updated periodically (e.g., based on a time period and/or in response to certain events). Whether precomputed or dynamically determined, the viewing distance 204 may be used to determine the range for the predefined display characteristic value.

Turning now to the viewing environment 200(2), the viewing environment 200(2) may include the user 108(2) interacting with the electronic device 202(2) (e.g., viewing visual output information, inputting information at an input device, etc.). The electronic device 202(2) is an example of a fixed user device such as computer with an integrated display. The user 108(2) may view a display of the electronic device 202(2) at a viewing distance 204(2), measured between the display and the user 108(2) (e.g., eyes of the user 108(2)).

The viewing environment 200(3) may include the user 108(3) interacting with the electronic device 202(3) (e.g., viewing visual output information, inputting information at an input device, etc.). The electronic device 202(3) is an example of a moveable user device such as a laptop computer. The user 108(3) may view a display of the electronic device 202(3) at a viewing distance 204(3), measured between the display and the user 108(3) (e.g., eyes of the user 108(3)).

The viewing environment 200(4) may include the user 108(4) interacting with the electronic device 202(4) (e.g., viewing visual output information, inputting information at an input device, etc.). The electronic device 202(4) is an example of a fixed electronic device such as a monitor or a television screen. The user 108(4) may view a display of the electronic device 202(4) at a viewing distance 204(4), measured between the display and the user 108(4) (e.g., eyes of the user 108(4)).

Figure 3:
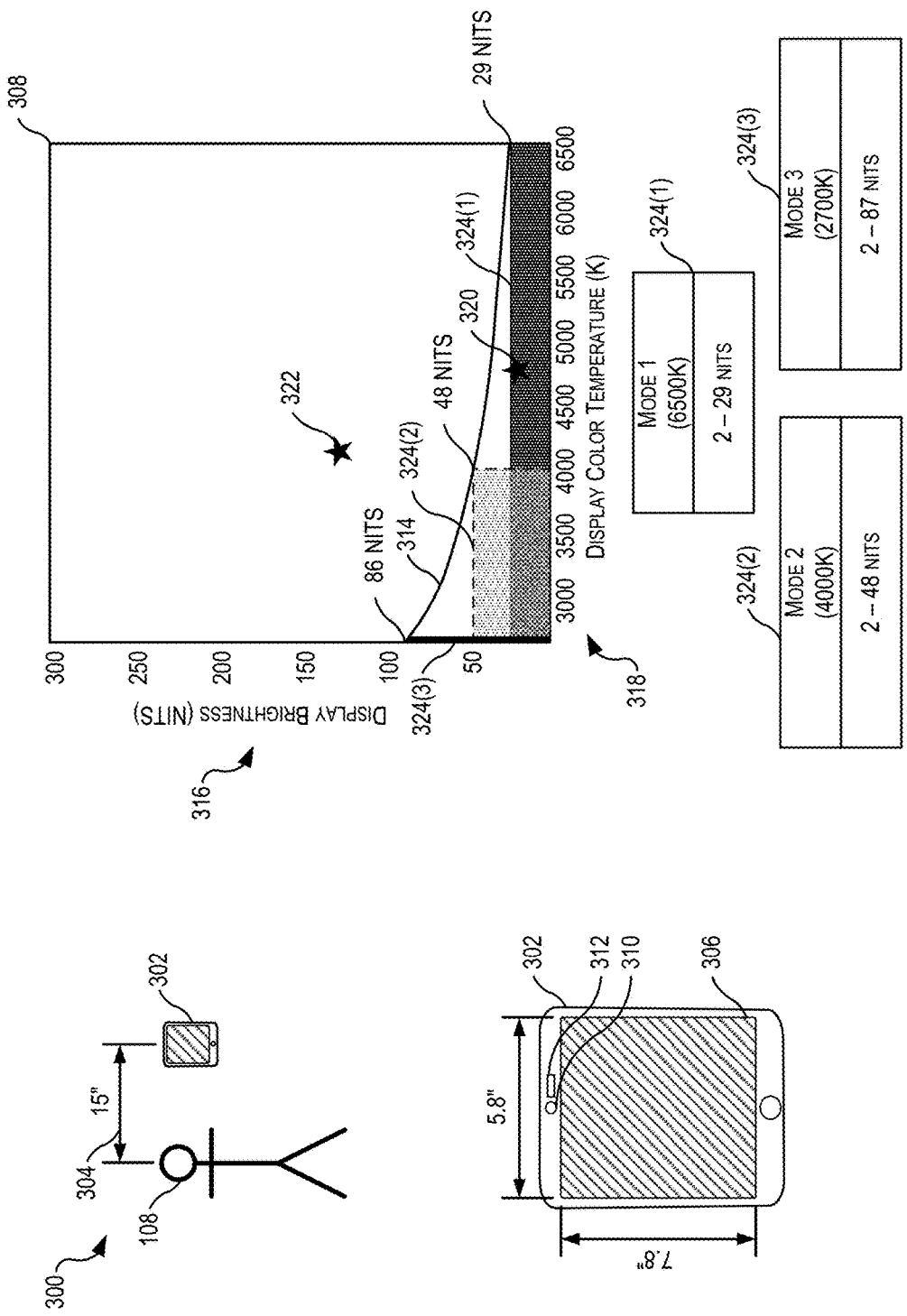
FIG. 3 illustrates aspects of adjusting display parameters to maintain a display characteristic value, according to at least one example.

FIG. 3 illustrates aspects of adjusting display parameters to maintain a display characteristic value as described herein, according to at least one example. In particular, FIG. 3 illustrates a viewing environment 300 that includes the user 108 viewing an electronic device 302 at a viewing distance 304 (e.g., 15 inches). The viewing environment 300 is an example of the viewing environments 200. The electronic device 302 is an example of the electronic devices 202. Based on conditions of the viewing environment 300, data may be generated that can be used to implement the techniques described herein relating to adjusting display parameters to maintain a display characteristic value. A display characteristic value graph 308 provides a graphical depiction of such data.

The electronic device 302 may be a mobile user device such as a tablet. The electronic device 302 may include a display 306 having a fixed area (e.g., width of 5.8"×height of 7.8"), a first system 310 for measuring viewing distances, and a second system 312 for measuring light. The area of the display 306 may be precomputed and stored in the memory of the electronic device 302 and/or some other device that generates data to be used by the electronic device 302 to adjust the display parameters of the electronic device 302. For example, a server computer may generate such data (e.g., like in display characteristic value graph 308) and provide the data to the electronic device 302.

The first system 310 may include one or more sensors configured to measure depth of field. For example, the first system 310 may include an infrared laser projector and an image sensor (e.g., a complementary metal-oxide-semiconductor (CMOS) sensor), a depth sensor, and any other suitable sensor or combination of sensors and projectors. The second system 312 may include one or more sensors configured to measure ambient light, light projected from the display 306, and other light-related measurements. For example, the second system 312 may include a spectrometer or other sensor capable of measuring light and/or brightness. As described herein, a system can be any combination of devices and/or software of performing one or more features of functions of device 302 or any device.

Turning now to the display characteristic value graph 308, the graph 308 may depict a predefined display characteristic value 314. The predefined display characteristic value 314 has been computed based at least in part on the viewing distance 304 and the area of the display 306. In this example, the predefined display characteristic value 314 represents a predefined physiological relationship between brightness and color temperature based on the particular electronic device 302. The graph 308 may include a total brightness range 316 for the display 306 and a total color temperature range 318 for the display 306. The total brightness range 316 may correspond to a total range of brightness adjustment for the display 306. The total color temperature range 318 may correspond to a total range of color temperature adjustment for the display 306. In some examples, the brightness adjustment and the color temperature adjustment exceeds the ranges 316, 318.

The predefined display characteristic value 314 is depicted as a curve, with suitable brightness values and color temperature values falling below the curve (e.g., within the ranges 316, 318). The predefined display characteristic value 314 may be computed based on the viewing distance 304 and the area of the display 306. The suitable brightness values and color temperature values are suitable in the sense that if parameters of the display 306 are configured according to sets of these values, the desired physiological effect will not likely be interrupted (e.g., the user's 108 transition into a more restful state at night will not be blocked, including the release of a soporific hormone). Thus, the predefined display characteristic value 314 is used to represent the relationship between brightness and color temperature with respect to a certain physiological effect. The predefined display characteristic value 314 may function as a threshold. When brightness values and color temperature values fall within the threshold (e.g., star 320), the physiological effect will not likely be interrupted. However, when one or more of the brightness value or color temperature value exceed the threshold (e.g., star 322), the physiological effect may likely be interrupted. Thus, the techniques described herein may adjust brightness and color temperature of the display 306 values with respect to the predefined display characteristic value 314 (e.g., above, below, or on the curve representing the predefined display characteristic value 314).

The electronic device 302 may include one or more display parameter modes 324(1)-324(3). Selection of one of the modes 324 may define a range of brightness values and a range of color temperature values with respect to the predefined display characteristic value 314 (e.g., to maintain the predefined display characteristic value 314 by staying within the threshold defined by the curve). The display parameter modes 324 may be stored in configuration settings in the electronic device 302 and/or may be stored in association with an application running on the electronic device 302. In any event, the display parameter modes 324 may be user-selectable and/or may be automatically selected. For example, the electronic device 302 may alternate between the display parameter modes 324 in an automated manner, which may include one or more default modes.

The first display parameter mode 324(1) may include a range of color temperature values between 2700K and 6500K, and a range of brightness values between 2 and 29 nits. The second display parameter mode 324(2) may include a range of color temperature values between 2700K-400K, and a range of brightness values between 2-48 nits.

The third display parameter mode 324(3) may include a range of color temperature values of around 2700K, and a range of brightness values between 2-87 nits. Other display parameter modes having different ranges may also be used in accordance with the techniques described herein. In some examples, configuring display parameters in accordance with the one of the display parameter modes 324 may limit the permissible range of color temperature values and the permissible range of brightness values available for selection. This may lead to fewer possible combinations of brightness values and color temperature values from which selections may be made. This may also have other benefits. For example, energy in the form of battery life may be conserved by using one mode instead of another.

Figure 4:
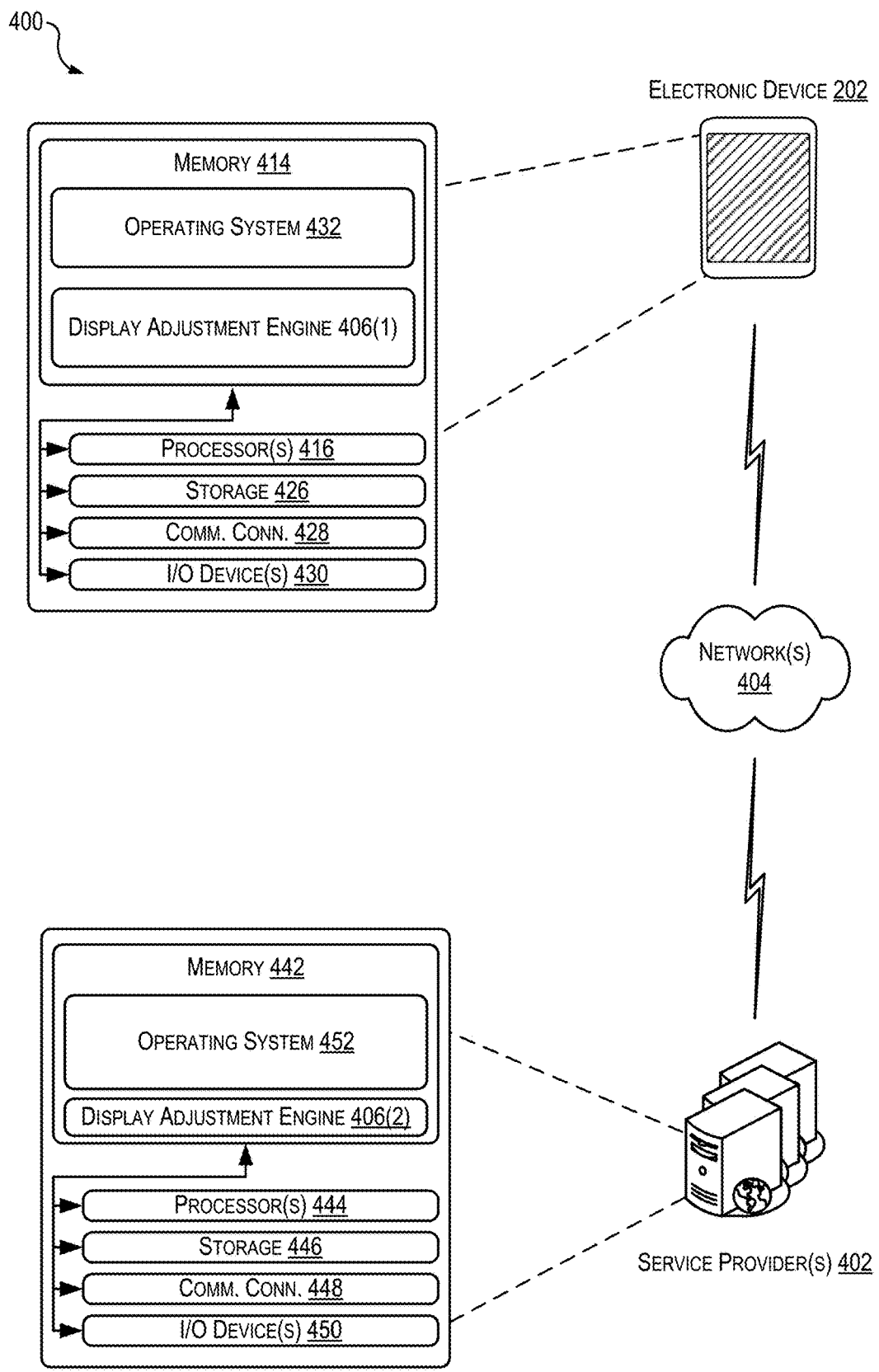
FIG. 4 illustrates a simplified block diagram including an example architecture for adjusting display parameters to maintain a display characteristic value, according to at least one example.

FIG. 4 illustrates an example architecture or environment 400 configured to implement techniques for adjusting display parameters to maintain a display characteristic value, according to at least one example. In some examples, the example architecture 400 may further be configured to manage or otherwise interact with the electronic device 202 and/or service provider computers 402. In some examples, the devices may be connected via one or more networks 404 (e.g., via Bluetooth, WiFi, the Internet, or the like). In the architecture 400, one or more users may utilize the electronic device 202 to interact with the service provider computers 402 via the one or more networks 404. Additionally, in some examples, the service provider computers 402 and the electronic device 202 may be configured or otherwise built as a single device. For example, the electronic device 202 may be configured to implement the embodiments described herein as a single computing unit, exercising the examples described above and below without the need for the other devices described.

In some examples, the network 404 may include any one or a combination of many different types of networks, such as cable networks, the Internet, wireless networks, cellular networks, satellite networks, other private and/or public networks, or any combination thereof. While the illustrated example represents the electronic device 202 accessing the service provider computers 402 via the networks 404, the described techniques may equally apply in instances where the electronic device 202 interacts with the service provider computers 402 over a landline phone, via a kiosk, or in any other manner. It is also noted that the described techniques may apply in other client/server arrangements (e.g., set-top boxes, etc.), as well as in non-client/server arrangements (e.g., locally stored applications, peer to peer configurations, etc.).

The electronic device 202 may be any type of computing device such as, but not limited to, a mobile phone, a smartphone, a personal digital assistant (PDA), a laptop computer, a desktop computer, a thin-client device, a tablet computer, a wearable device, or the like (e.g., the computing device 104 and the display 106 or the electronic device 302).

In one illustrative configuration, the electronic device 202 may include at least one memory 414 and one or more processing units (or processor(s)) 416. The processor(s) 416 may be implemented as appropriate in hardware, computer-executable instructions, firmware, or combinations thereof. Computer-executable instruction or firmware implementations of the processor(s) 416 may include computer-executable or machine-executable instructions written in any suitable programming language to perform the various functions described. The electronic device 202 may also include geo-location devices (e.g., a global positioning system (GPS) device or the like) for providing and/or recording geographic location information associated with the electronic device 202.

The memory 414 may store program instructions that are loadable and executable on the processor(s) 416, as well as data generated during the execution of these programs. Depending on the configuration and type of the electronic device 202, the memory 414 may be volatile (such as random access memory (RAM)) and/or non-volatile (such as read-only memory (ROM), flash memory, etc.). The electronic device 202 may also include additional removable storage and/or non-removable storage 426 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 414 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 414 and the additional storage 426, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 414 and the additional storage 426 are both examples of non-transitory computer storage media. Additional types of computer storage media that may be present in the electronic device 202 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the electronic device 202. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The electronic device 202 may also contain communications connection(s) 428 that allow the electronic device 202 to communicate with a data store, another computing device or server, user terminals, and/or other devices via the network 404. The electronic device 202 may also include I/O device(s) 430, such as a keyboard, a mouse, a pen, a voice input device, a touch input device, a display, speakers, a printer, etc.

Turning to the contents of the memory 414 in more detail, the memory 414 may include an operating system 432 and/or one or more application programs or services for implementing the features disclosed herein including a display adjustment engine 406(2).

The service provider computers 402 may also be any type of computing device such as, but not limited to, a mobile phone, a smartphone, a PDA, a laptop computer, a desktop computer, a thin-client device, a tablet computer, a wearable device, etc. In some examples, the service provider computers 402 may be in communication with the electronic device 202 via the network 404, or via other network connections.

In one illustrative configuration, the service provider computers 402 may include at least one memory 442 and one or more processing units (or processor(s)) 444. The processor(s) 444 may be implemented as appropriate in hardware, computer-executable instructions, firmware, or combinations thereof. Computer-executable instruction or firmware implementations of the processor(s) 444 may include computer-executable or machine-executable instructions written in any suitable programming language to perform the various functions described.

The memory 442 may store program instructions that are loadable and executable on the processor(s) 444, as well as data generated during the execution of these programs. Depending on the configuration and type of service provider computer 402, the memory 442 may be volatile (such as RAM) and/or non-volatile (such as ROM, flash memory, etc.). The service provider computer 402 may also include additional removable storage and/or non-removable storage 446 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 442 may include multiple different types of memory, such as SRAM, DRAM, or ROM. While the volatile memory described herein may be referred to as RAM, any volatile memory that would not maintain data stored therein once unplugged from a host and/or power would be appropriate. The memory 442 and the additional storage 446, both removable and non-removable, are both additional examples of non-transitory computer-readable storage media.

The service provider computer 402 may also contain communications connection(s) 448 that allow the service provider computer 402 to communicate with a data store, another computing device or server, user terminals and/or other devices via the network 404. The service provider computer 402 may also include I/O device(s) 450, such as a keyboard, a mouse, a pen, a voice input device, a touch input device, a display, speakers, a printer, etc.

Turning to the contents of the memory 442 in more detail, the memory 442 may include an operating system 452 and/or one or more application programs or services for implementing the features disclosed herein including the display adjustment engine 406(2). In some examples, the display adjustment engine 406(3) may be configured to compute and adjustment display parameters of a display to maintain a display characteristic value, as described herein.

Figure 5:
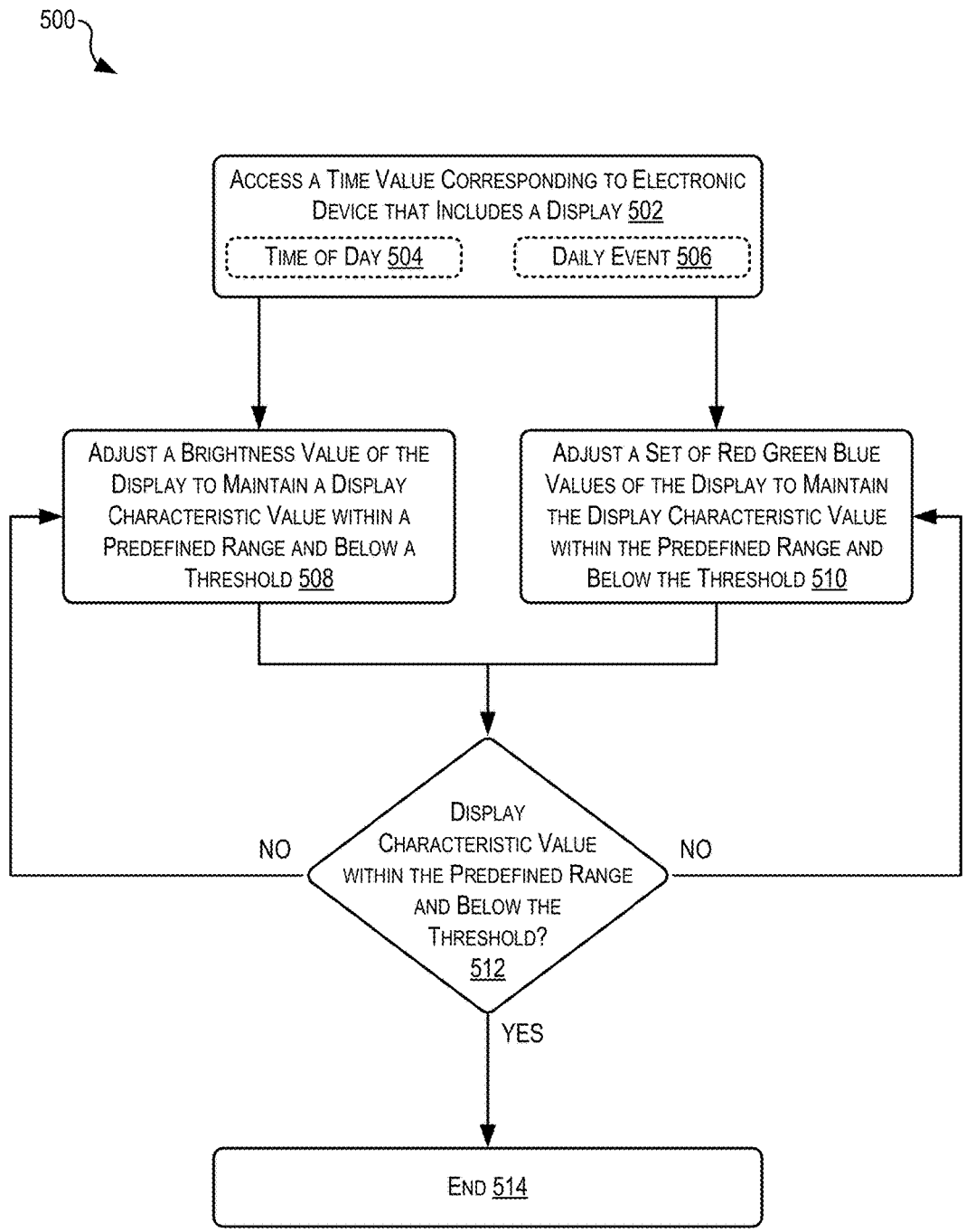
FIG. 5 illustrates a flowchart of a method of adjusting display parameters to maintain a display characteristic value, according to at least one example.
Figure 6:
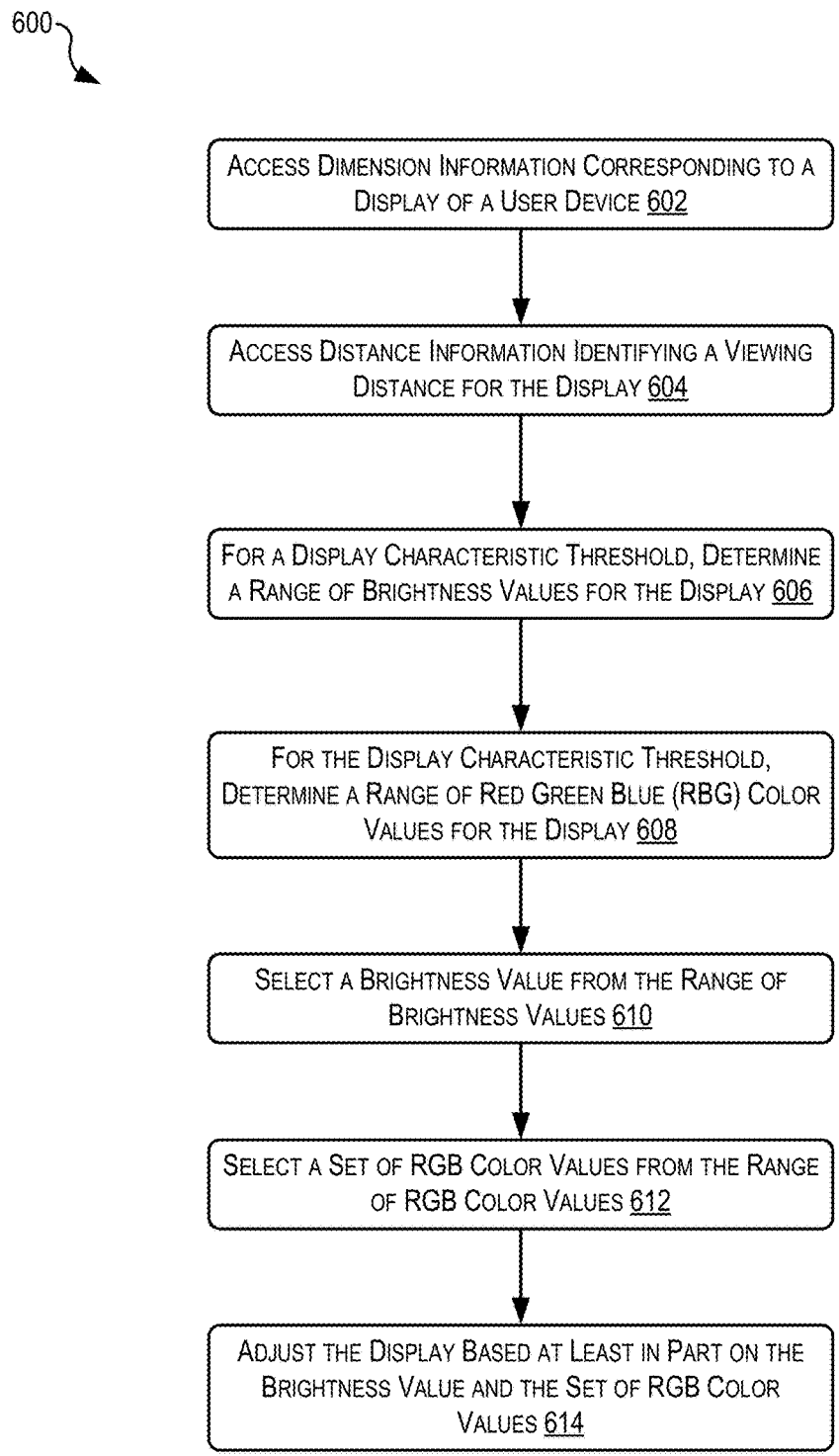
FIG. 6 illustrates a flowchart of a method of adjusting display parameters to maintain a display characteristic value, according to at least one example.
Figure 7:
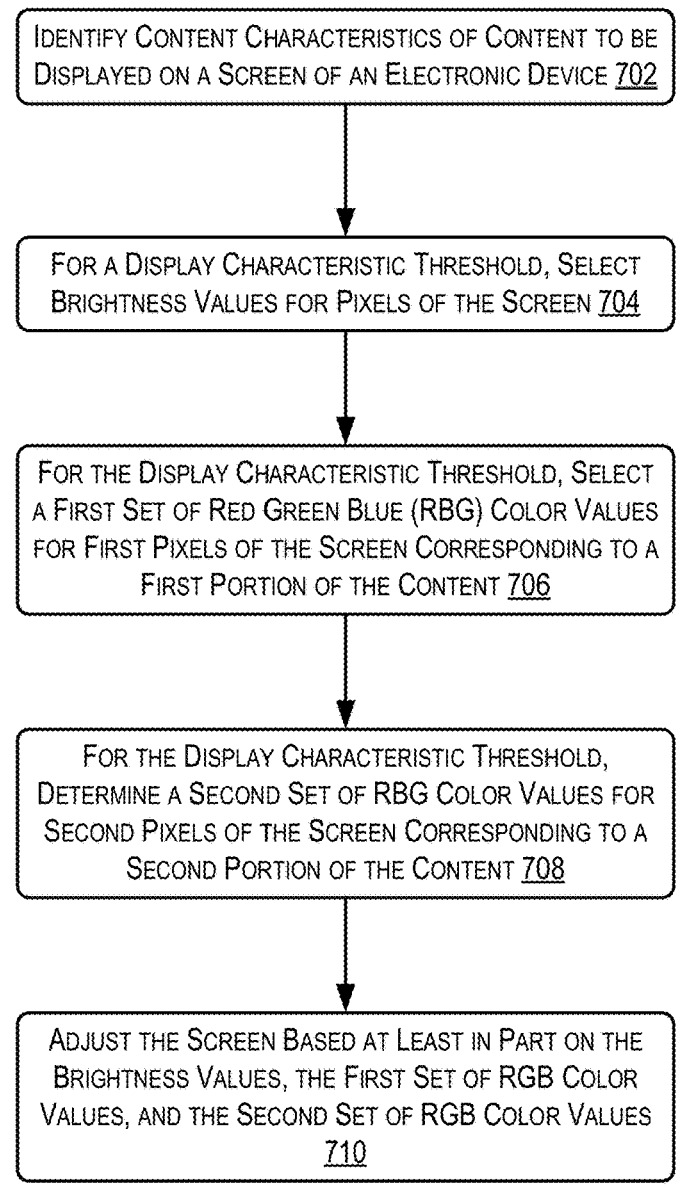
FIG. 7 illustrates a flowchart of a method of adjusting display parameters to maintain a display characteristic value, according to at least one example.

FIGS. 5-7 illustrate example flow diagrams showing processes 500, 600, and 700 for adjusting display parameters to maintain a display characteristic value, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

FIG. 5 depicts the process 500 including example acts or techniques for adjusting display parameters to maintain a display characteristic value, according to at least one example. The display adjustment engine 406, whether embodied in the electronic device 202 or the service provider 402, or any suitable combination of the foregoing may perform the process 500 of FIG. 5. The process 500 begins at 502 by accessing a time value corresponding to an electronic device that includes a display. The time value may include a time of day 504 (e.g., 7:30 pm) or a daily event 506 (e.g., sunset). Accessing the time value may include detecting fulfillment of a condition that is based on the time value. In some examples, prior to accessing the time value, the display parameters of the display of the electronic device may remain in their existing state. In some examples, the time value may be controllable by a user setting of the electronic device.

At 508, the process 500 adjusts a brightness value of the display to maintain a display characteristic value within a predefined range and below a threshold. The adjustment may be based at least in part on the time value. The display characteristic value may be independently controllable by at least one of brightness of the display and color temperature of the display. The display characteristic value may represent a predefined physiological effect that is based at least in part on the brightness of the display and the color temperature of the display. In some examples, the predefined physiological effect may correspond to a human body's transition into a more restful state at night, including, in some examples, the release of a soporific hormone. In some examples, the display characteristic value may be based at least in part on an area of a screen of the display and a viewing distance associated with the display. The viewing distance may correspond to a distance between the screen and a user of the electronic device. The viewing distance may be precomputed or determined based on sensor data obtained by a sensor of the electronic device.

At 510, the process 500 adjusts, based at least in part on the time value, a set of red green blue (RGB) color values of the display to maintain the display characteristic value within the predefined range and below the threshold. The adjustment at 506 may be based at least in part on the time value and in a manner that is independent of the adjustment to the brightness value. The adjustment at 506 may be performed while maintaining the brightness value of the display or by independently adjusting the brightness value at approximately the same time as the adjusting of the set of RGB color values of the display. In some examples, adjusting the set of RGB color values may include adjusting blue and green color values of the set of RGB color values while holding red color values constant. The set of RGB color values may correspond to a set of pixels that make up the display.

At 512, the process 500 determines whether the display characteristic value is within the predefined range and below the threshold. For example, after an adjustment is made at 508 and/or 510, the process 500, at 512, may confirm that the display characteristic value remains within the predefined range and below the threshold. In some examples, the determination at 512 takes place at approximately the same time as processing at blocks 508 and/or 510. If the answer at 512 is NO, the process 500 continues to 508 and/or 510 and makes further adjustments to the brightness value and/or the set of RGB color values. If the answer at 512 is YES, the process 500 ends at 514.

In some examples, the set of RGB color values may be a first set of RGB color values corresponding to a first portion of content displayed on the display. The process 500 may further include identifying content characteristics corresponding to the content displayable on the display. In this example, the process 500 may be further independent of the adjustment to the brightness value and the adjustment to the first set of RGB color values, adjusting, based at least in part on the content characteristics, a second set of RGB color values of the display to maintain the display characteristic value within the predefined range and below the threshold. The second set of values may correspond to a second portion of the content.

In some examples, the process 500 may further include receiving light information corresponding to ambient light in which the electronic device is located. In this example, adjusting the set of RGB color values may be further based at least in part on the light information.

In some examples, the process 500 may further include accessing a later time value representing a later particular time or a different daily event. In this example, based at least on response to accessing the later time, the process 500 may further include adjusting the brightness value and the RGB color values of the display such that the display characteristic value exceeds the threshold. For example, if the time value corresponds to a sunset event, the later time value may correspond to a sunrise event or a midday event (e.g., the different daily event), and the process 500 may adjust the parameters of the display to be brighter and/or cooler in temperature. This change may correspond to the sunrise or other movements of the sun throughout the day. This change may be continuous such that at midday, the display is the brightest and the color temperature is the coolest. From midday, the brightness of the display may be reduced, while the color temperature becomes warmer.

FIG. 6 depicts the process 600 including example acts or techniques for adjusting display parameters to maintain a display characteristic value, according to at least one example. The display adjustment engine 406, whether embodied in the electronic device 202 or the service provider 402, or any suitable combination of the foregoing may perform the process 600 of FIG. 6. The process 600 begins at 602 by accessing dimension information corresponding to a display of a user device. This may include accessing the dimension information from memory of the user device, receiving the dimension information as a user input at the user device, or in any other suitable manner.

At 604, the process 600 accesses distance information identifying a viewing distance for viewing the display. In some examples, this may include accessing the distance information from a sensor of the user device. The sensor may be configured to collect sensor data usable to determine the viewing distance. In some examples, the process 600 may further include accessing other distance information and determining a new viewing distance based on the other distance information.

At 606, the process 600, for a display characteristic threshold, determines a range of brightness values for the display. This may be based at least in part on the dimension information and the distance information. The range of brightness value may include brightness values below the display characteristic threshold. The display characteristic threshold may include a fixed display characteristic value that represents a predefined physiological effect that is based at least in part on brightness of the display and color temperature of the display.

At 608, the process 600, for the display characteristic threshold, determines a range of red green blue (RGB) color values for the display. This may be based at least in part on the dimension information and the distance information. The range of RGB color values may include RGB color values below the display characteristic threshold.

At 610, the process 600 selects a brightness value for the display from the range of brightness values. This may be based at least in part on a time value that represents a particular time of day or a particular daily event. In some examples, selecting the brightness value may include selecting the brightness value to maintain a display characteristic value within a display characteristic threshold.

At 612, the process 600 selects a set of RGB color values for the display from the range of RGB color values. This may be based at least in part on a time value that represents a particular time of day or a particular daily event. In some examples, selecting the set of RGB color values may include, independent of the selecting of the brightness value, selecting, based at least in part on the time value, the set of RGB color values to maintain the display characteristic value within the display characteristic threshold while maintaining the brightness value. Selecting the set of RGB color values may also include independently selecting the brightness value at approximately the same time as the selecting of the set of RGB color values.

At 614, the process 600 adjusts the display based at least in part on the brightness value and the set of RGB color values. This may include adjusting parameters of the display such as a brightness parameter and color temperature parameters of the RGB color values. In some examples, adjusting the display may include adjusting RGB channels and brightness values of pixels of the display.

FIG. 7 depicts the process 700 including example acts or techniques for adjusting display parameters to maintain a display characteristic value, according to at least one example. The display adjustment engine 406, whether embodied in the electronic device 202 or the service provider 402, or any suitable combination of the foregoing may perform the process 700 of FIG. 7. The process 700 begins at 702 by identifying content characteristics of content to be displayed on a screen of an electronic device. The content characteristics may be identified from metadata associated with the content and/or from processing of the content itself. The content characteristics may identify, for example, a type of content (e.g., video, images, text, audio, or some combination of the foregoing), color channel information (e.g., values for RGB color channels for individual pixels), and any other suitable information descriptive of the content.

At 704, the process 700, for a display characteristic threshold, selects brightness values for pixels of the screen. This selection may be based at least in part on the content characteristic. In this manner, the brightness of the screen may be changed at a pixel by pixel level of granularity and in a manner that corresponds to the content being displayed by groups of pixels. The brightness values may be selected such that a display characteristic value corresponds to the display characteristic threshold. For example, a first brightness value may be selected for a first set of pixels and a second brightness value may be selected for a second set of pixels.

At 706, the process 700, for the display characteristic value, selects a first set of red blue green (RGB) color values for first pixels of the screen corresponding to a first portion of the content. The first pixels may be in the first set of pixels or the second set of pixels described above, or may be different pixels. Thus, brightness and color values may be independently adjusted with respect to portions of the content. The first set of RGB color values may be selected such that the display characteristic value corresponds to the display characteristic threshold.

At 708, the process 700, for the display characteristic threshold, determines a second set of RGB color values for second pixels of the screen corresponding to a second portion of the content. Again, these second pixels may be in the first set of pixels or the second set of pixels described above, or may be different pixels. Thus, the brightness and color values may be independently adjusted with respect to portions of the content. The second set of RGB color values may be selected such that the display characteristic value corresponds to the display characteristic threshold.

At 710, the process 700 adjusts the screen based at least in part on the brightness values, the first set of RGB color values, and the second set of RGB color values. The brightness values, the first set of RGB color values, and the second set of RGB color values may be selected such that the display characteristic value corresponds to the display characteristic threshold.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An electronic device, comprising:
   a display;
   a memory configured to store computer-executable instructions; and
   a processor in communication with the memory and configured to execute the computer-executable instructions to at least:
      access a brightness setting for the display;
      access a color temperature setting for the display;
      detect fulfillment of a time condition that corresponds to a particular time of day or a particular daily event; and
      at least in response to the detecting, independently adjust the brightness setting and the color temperature setting to maintain a display characteristic value that is:
         within a predefined range of display characteristic values; and
         below a display characteristic threshold, the display characteristic value representing melanopic illuminance that corresponds to a predefined physiological effect that is based at least in part on the brightness of the display, the color temperature of the display, an area of a screen of the display, and a viewing distance associated with the display.

2. The electronic device of claim 1, wherein:
   the viewing distance corresponds to a distance between the screen and a user of the electronic device; and
   the electronic device further comprises a sensor configured to obtain data useable to determine the viewing distance.

3. The electronic device of claim 1, wherein the time condition is controllable by a user setting of the electronic device.

4. The electronic device of claim 1, wherein the particular daily event comprises at least one of a sunrise, a sunset, a midday event, or a user-defined event.

5. The electronic device of claim 1, wherein the predefined physiological effect corresponds to a transition of a human body into a more restful state.

6. The electronic device of claim 1, wherein independently adjusting the brightness setting and the color temperature setting to maintain the display characteristic value comprises adjusting the brightness setting and the color temperature setting at the same time.

7. A computer-implemented method, comprising:
   accessing a time value corresponding to an electronic device that comprises a display, the time value representing a particular time of day or a particular daily event;
   adjusting, based at least in part on the time value, a brightness value of the display to maintain a display characteristic value within a predefined range and below a threshold, the display characteristic value independently controllable by one of the brightness value of the display or a color temperature of the display, the display characteristic value representing melanopic illuminance that corresponds to a predefined physiological effect that is based at least in part on the brightness value, the color temperature, an area of a screen of the display, and a viewing distance associated with the display; and independent of the adjusting of the brightness value, adjusting, based at least in part on the time value, a set of red green blue (RGB) color values of the display to maintain the display characteristic value within the predefined range and below the threshold while maintaining the brightness value of the display or independently adjusting the brightness value at the same time as the adjusting of the set of RGB color values of the display.

8. The computer-implemented method of claim 7, wherein accessing the time value comprises detecting fulfillment of a time condition that references the time value.

9. The computer-implemented method of claim 7, further comprising identifying content characteristics corresponding to content displayable on the display.

10. The computer-implemented method of claim 9, wherein:
the set of RGB color values is a first set of RGB color values corresponding to a first portion of the content; and
the method further comprises, independent of the adjusting to the brightness value and the adjusting to the first set of RGB color values, adjusting, based at least in part on the content characteristics, a second set of RGB color values of the display to maintain the display characteristic value within the predefined range and below the threshold while, the second set of RGB color values corresponding to a second portion of the content.

11. The computer-implemented method of claim 7, wherein:
the method further comprises receiving light information corresponding to ambient light; and
adjusting the set of RGB color values is further based at least in part on the light information.

12. The computer-implemented method of claim 7, wherein adjusting the set of RGB color values comprises adjusting blue and green color values of the set of RGB color values while holding red color values constant.

13. The computer-implemented method of claim 7, further comprising:
accessing a later time value representing a later particular time or a different daily event; and
based at least in response to accessing the later time value, adjusting the brightness value and the RGB color values of the display such that the display characteristic value exceeds the threshold.

14. One or more non-transitory computer-readable storage media storing computer-executable instructions that, when executed by a processor, configure the processor to perform operations comprising:

accessing dimension information corresponding to a display of a user device; accessing distance information identifying a viewing distance for viewing the display;
determining a display characteristic threshold that represents a relationship between a brightness of the display and a color temperature of the display with respect to a physiological effect comprising melanopic illuminance, the physiological effect being impacted at least when a brightness value exceeds the display characteristic threshold;
for the display characteristic threshold,
determining a range of brightness values for the display based at least in part on the dimension information and the distance information, the range of brightness values comprising brightness values below the display characteristic threshold; and
determining a range of red green blue (RGB) color values for the display based at least in part on the dimension information and the distance information, the range of RGB color values comprising RGB color values below the display characteristic threshold; and
selecting a brightness value and a set of RGB color values for the display from the range of brightness values and the range of RGB color values based at least in part on a time value that represents a particular time of day or a particular daily event.

15. The one or more non-transitory computer-readable storage media of claim 14, wherein:
accessing the dimension information comprises accessing the dimension information from memory of the user device; and
accessing the distance information comprises accessing the distance information from a sensor of the user device.

16. The one or more non-transitory computer-readable storage media of claim 14, wherein:
the operations further comprise accessing mode information corresponding to a display mode of the user device; and
selecting the brightness value and the set of RGB color values is further based at least in part on the mode information.

17. The one or more non-transitory computer-readable storage media of claim 14, wherein selecting the brightness value and the set of RGB color values for the display comprises:
selecting, based at least in part on the time value, the brightness value to maintain a display characteristic value within the display characteristic threshold; and
independent of the selecting of the brightness value, selecting, based at least in part on the time value, the set of RGB color values to maintain the display characteristic value within the display characteristic threshold while maintaining the brightness value or independently selecting the set of RGB color values at the same time as the selecting of the brightness value.

* * * * *